United States Patent Office 3,507,661
Patented Apr. 21, 1970

3,507,661
GELATIN CONTAINING DISPERSIONS HAVING GELATIN REACTIVE POLYMERS THEREIN AND COATINGS PREPARED THEREFROM
Ronald F. Ofstead, St. Paul, Minn., assignor to Minnesota Mining and Manufacturing Company, St. Paul, Minn., a corporation of Delaware
No Drawing. Continuation-in-part of application Ser. No. 569,827, Aug. 3, 1966. This application Feb. 5, 1969, Ser. No. 796,935
Int. Cl. G03c 1/04; C09h 11/00
U.S. Cl. 96—114                    19 Claims

ABSTRACT OF THE DISCLOSURE

Improved gelatin films and coatings having a continuous phase of gelatin and a water impermeable discontinuous phase of a normally solid, water insoluble polymer having a molecular weight of at least 10,000 and a degree of polymerization of at least 50, the water insoluble polymer being covalently bonded directly to said gelatin at the interface between said phases. Also describes aqueous dispersions comprising gelatin and a dispersed phase of a gelatin reactive, water insoluble polymer and the process for preparing improved gelatin films and coatings from said aqueous dispersions.

---

This application is a continuation-in-part of United States patent application Ser. No. 569,827, filed Aug. 3, 1966, now abandoned.

This invention relates to novel gelatin containing dispersions and also to photographic emulsions having improved physical properties. In one aspect this invention relates to gelatino-silver halide photographic emulsions and their preparation. In still another aspect this invention relates to a process for preparing film constructions having a gelatin layer of improved physical properties.

The chemical and patent literature reveal extensive research on attempts to improve the physical characteristics of gelatin films, particularly light sensitive, silver halide containing layers in the field of photographic films. Photographic emulsions conventionally have relied on gelatin as the silver halide containing matrix or binder. However, such gelatin layers possess several undesirable properties, among which are excessive brittleness under conditions of low temperature and/or humidity, poor abrasion and scratch resistance, insufficient mechanical stability during processing at elevated temperatures, and slow drying rate. In order to overcome the water susceptibility of gelatin and enhance its general physical properties it is common practice to employ crosslinking or hardening agents, such as formaldehyde, dichromate, etc., which chemically link the polypeptide chains. Unfortunately, with most photographic gelatin excessive hardening results in an undesirable increase in brittleness, decrease in water permeability, increase in fog levels and premature gelation or viscosity change during the holding period prior to coating.

For these and other reasons a variety of "gelatin substitutes" have been suggested, replacing all or a portion of the gelatin in photographic layers. Although many synthetic polymers have been mentioned for this purpose, the improvement in some of the physical properties is usually accomplished only with a sacrifice in others, and the sensitometric properties of the photographic layer can be adversely affected. Water soluble polymers have been suggested as gelatin substitutes, since gelatin is generally incompatible with the water insoluble synthetic polymers.

Accordingly it is an object of this invention to provide improved gelatin containing dispersions and layers.

Still another object of this invention is to provide photographic emulsions having a combination of outstanding physical properties.

A further object of this invention is to provide a photographic coating composition which can be readily coated onto film base and which develops the desired physical properties in film form subsequent to the coating operation.

Another object of this invention is to provide photographic emulsions in which the physical properties can be controllably varied over a wide range.

Other objects and advantages will be apparent from the following disclosure.

In accordance with this invention it has been found that aqueous dispersions of normally solid, water insoluble polymers comprised of recurring monomer units, at least 1 mol percent (preferably from 5 to 30 mol percent) of which contain one or more gelatin-reactive groups, may be incorporated into a gelatin emulsion and subsequently reacted with the gelatin to form a crosslinked polymeric matrix. Any water insoluble polymer having the aforementioned gelatin-reactive groups and having relatively high molecular weight, i.e. having a degree of polymerization of at least 50 and a molecular weight of at least 10,000, may be used. A preferred class of polymers are those having a molecular weight such that the glass transition temperature ($T_g$) is substantially independent of molecular weight, as discussed in J. Poly. Sci., 3A, 3579 (1965). The water insoluble polymer is used in the form of an aqueous dispersion which usually is stabilized in conventional manner with a protective colloid, dispersing agent or emulsifier. "Dispersion," as used herein, is defined in Polymer Processes, Calvin E. Schildknecht, page 625, Interscience Publishers, Inc., New York, and includes latices, hydrosols, and suspensions, usually with an average particle size below about 1800 angstroms. The water insoluble polymers must contain "gelatin-reactive groups," e.g. groups which react with gelatin with the formation of covalent chemical bonds at temperatures below about 60° C. in an aqueous system of pH 5 to 11. Such gelatin-reactive groups include epoxy, aldehyde, N-methylol amide, alpha-haloester, alpha-haloamide, aziridine, anhydride, isocyanate, imide and others which react with gelatin with covalent bonding and which, like the foregoing, are commonly employed or useful as the reactive group in hardening and crosslinking gelatin with non-polymeric materials. A comprehensive discussion of such gelatin hardening, gelatin hardening groups, and the covalent bonding of gelatin-reactive groups to gelatin appears in The Theory of the Photographic Process, edited by C. E. K. Mees and T. H. James, pages 54–60, third edition, The Macmillan Co., New York (1966), which is incorporated herein by reference. Because the properties desired in an emulsion layer may vary greatly with the particular use of the film, the mol percent of recurring monomer units containing gelatin-reactive groups in the water insoluble polymer can be as low as about 1 mol percent. The polymer containing gelatin-reactive groups may be water wettable, swellable or hydrophilic, but it must be water insoluble at temperatures below 60° C. at pH 5 to 11. Although some water soluble polymers react with gelatin in aqueous media, usually by salt formation, this tends to increase the viscosity of the media and seriously complicate the coating operation. In contrast, the water insoluble polymers of this invention are relatively unreactive with gelatin while in aqueous media as the disperse phase, the crosslinking reaction proceeding after the aqueous dispersions is coated onto a support, either during or after drying.

The properties of the water insoluble, gelatin-reactive polymers may also be varied to alter the physical characteristics of the emulsion layer. Although homopolymers such as polyglycidyl acrylate may be used in practicing this invention, the use of copolymers permits more versatility in combining the desirable properties of several different monomers. For example, when used in a photographic emulsion system, monomers useful in imparting flexibility to the layer and in reducing curling and brittleness include acrylate esters (e.g. ethyl acrylate, butyl acrylate, 2-ethylhexyl acrylate), vinyl esters (e.g. vinyl acetate, vinyl propionate), conjugated dienes (e.g. 1,3-butadiene, isoprene, chloroprene), etc. Monomers imparting toughness, strength and resistance to abrasion and scratching include styrene and acrylonitrile. Monomers providing gelatin-reactive groups include the epoxy containing monomers (e.g. glycidyl acrylate, glycidyl methacrylate), N-methylol amide monomers (e.g. N-methylol acrylamide, N-methylol methacrylamide), aldehyde containing monomers (e.g. acrolein, methacrolein or acetals or bisulfite addition products thereof), alpha-halo esters (e.g. vinyl alpha-bromoacetate) and aziridine containing monomers (e.g. N-allyl aziridine). Other monomers which may be included in water insoluble, gelatin-reactive copolymers are those polymerizable compounds having substituent groups capable of undergoing coupling reaction with oxidized developers during photographic processing, resulting in dye formation. Such monomers, also called "polymerizable color couplers" or "addition polymerizable monomeric color formers," are well known, as taught in British patent specification No. 1,130,581 and U.S. Patent No. 3,370,952. Illustrative of the addition polymerizable monomeric color formers are those of the formula

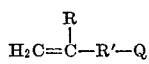

wherein R is hydrogen, alkyl of 1 to 4 carbon atoms, chlorine or bromine; R' is a divalent organic radical and Q is an active color former nucleus capable of forming upon chromogenic development of exposed silver halide images with a primary aromatic amine color-developing agent, a dye of the quinoneimine or azomethine class. With the incorporation of such monomers into the system the resulting gelatin reactive polymer also serves as a dispersed color coupler for photographic use. Since the relationship of monomers to the properties of their copolymers is well known and their preparation of such polymers is extensively described in the literature, further elaboration is not necessary for a complete understanding of this invention. U.S. 3,242,123 and other patents in the U.S. Patent Office provide but a few illustrative and useful water insoluble copolymers. Substantially colorless water insoluble polymers are preferred for photographic applications.

The ratio of water insoluble polymer to gelatin may be varied over wide limits, although generally from 1 to 95 weight percent (preferably 5 to 75 weight percent) of the total solids preferably are comprised of the water insoluble polymer. Photographic emulsion layers may be processed by innumerable well known procedures, and the larger amounts of water insoluble polymer and the resulting water resistance which such polymers tend to impart are highly advantageous for many photographic uses. However, a particularly surprising feature of the modified gelatin films or layers of this invention is that, even with relatively high percentages of water insoluble polymer in the crosslinked product, the permeability to aqueous photographic developer solutions remains high. Although a complete explanation of this phenomenon is not fully known, evidence indicates that the water insoluble polymers exist in the final layer or film as water impermeable dispersed particles in a continuous gelatin phase, crosslinking by direct covalent bonding occurring essentially at the interface of the two phases, thereby permitting the aqueous developer or processing solution to permeate the continuous gelatin phase and reach the silver halide or free silver grains.

The coating formulation may be prepared by simple admixture of a gelatin emulsion with an aqueous dispersion of water insoluble polymer, the percent solids being adjusted to provide optimum coating properties, e.g. viscosity, etc. Since the gelatin-reactive groups in the water insoluble polymer covalently bond to the gelatin, the conditions selected for the crosslinking reaction will depend on the nature of the gelatin-reactive groups and the environment in which the reaction occurs. This crosslinking reaction of gelatin to water insoluble polmer may be accelerated by drying the coated emulsion layer at slightly elevated temperature (e.g. 40–50° C.) for a short time, although the crosslinking reaction is normally accomplished at room temperature. The dispersed particles of water insoluble polymer are apparently stabilized by the dispersing agent in the aqueous dispersion, and the reaction between the water insoluble polymer and the gelatin does not occur to any significant extent until the dispersion media, i.e. water, is removed and intimate contact between the reactants is estabilshed. The coating mixture, with silver halide and other suitable emulsion additives, can be adjusted to a pH conventional for photographic emulsion (e.g. pH 5 to 8), depending on the photographic characteristics desired.

Although the aqueous dispersions and modified gelatin layers or films of this invention are particularly useful in silver halide photographic films, as described earlier, they may also be employed in the field of protective of decorative films (such as in coating fabric, glass, leather and leather substitutes, plastic, paper, etc.), as impregnants or saturants, in adhesives and as subbing compositions. They also find use as anti-halation layers, filter layers and topcoats in photographic films and other types of recording media. If desired, they may be cast in the form of self-supporting films, sheets or tapes. By properly selecting the water insoluble polymer the crosslinked gelatin layers and films of this invention can display varying degrees of resistance to curl, to embrittlement and to scratching without significant loss in water or moisture permeability.

The following examples are intended to illustrate the invention and not to limit the scope thereof.

Example 1

An aqueous dispersion of polyethyl acrylate homopolymer was prepared in a conventional manner by using sodium lauryl sulfate surfactant and 4,4' - azo-bis-(4-cyanopentanoic acid) initiator using the following conditions:

Ethyl acrylate—80 cc., 75 g., 0.74 mol
Surfactant—27 cc. of 10% aqueous solution
Water—153 cc.
Initiator—54 milligrams
Temperature—45±5° C.
Stirring rate—630±50 r.p.m.

Also prepared under similar conditions, except for monomer composition, was an aqueous dispersion of ethyl acrylate/glycidyl methacrylate copolymer (80/20 mol ratio). Both polymers were prepared with essentially complete conversion of monomer to a high molecular weight polymeric product having a degree of polymerization such that the glass transition temperature is substantially independent of molecular weight change. Mixtures of each of the above dispersions with gelatin solution were prepared to give 5.5% total polymer solids with 20% replacement of the gelatin with synthetic polymer. Coatings on plastic film were prepared and dried at room temperature. As an indication of inherent resistance of the layer to disintegration in solution at elevated temperatures, melting point tests were conducted as prescribed by ASA Test No. PH-4.11/1964. In this test, the film sample is immersed in an alkaline salt bath corresponding generally to a photographic developer composition and the bath temperature is increased at a prescribed rate. The following results were obtained.

| Film sample: | Melting point or distintegration point (degrees C.) |
|---|---|
| Gelatin (control) | 36 |
| Gelatin (80%)+ethyl acrylate homopolymer latex (20%) | 40 |
| Gelatin (80%)+ethyl acrylate/glycidyl methacrylate copolymer latex (20%) | 65 |

Although the aqueous homopolymer dispersion only slightly improved the melting or disintegration point, the dispersion of copolymer containing gelatin-reactive groups produced a significant increase in the melting or disintegration point.

Example 2

In Table I various dispersions and the conditions of their preparation are described. The surfactant was sodium lauryl sulfate and the initiator was 4,4'-azo-bis-(4-cyanopentanoic acid) in each instance unless noted otherwise.

For purposes of comparison coatings of gelatin-water insoluble polymer admixtures were prepared and total percent solids coating thickness and drying conditions were maintained as similar as possible, varying only the water insoluble polymer used and the relative weight ratios of gelatin to water insoluble polymer in the dispersion. In general the coating mixtures were maintained at approximately 35° C., and drying was done under ambient conditions of humidity and temperature. Table II summarizes experimental results, including melting point of the resulting film (ASA Test No. PH–4.11/1964) and wet scratch resistance (a measure of the weight load required for a standard probe to break through a film which has been swollen for two minutes at 68° F. in a conventional alkaline developer bath). Table III summarizes the effect of the various systems of Samples A–C upon curling characteristics of the gelatin layers. The measured values pertain to degrees of curl of a predetermined length of coated film ($\Delta°$) measured in changing relative humidity from 7±1 percent to 92.5±2.5 percent, using the following procedure:

A sample of film 15 mm. x 100 mm. is cut from preconditioned film and is rigidly clamped with parallel plate clamps about 20 mm. from one end of the sample. The sample is then placed lengthwise on its edge and positioned tangentially to a protractor, the film edge at this point corresponding to the 90 degree position. The clamp is butted against the bottom edge and film, when viewed from the top, is positioned at the center of the protractor. The sample may not always follow the 90 degree mark on a protractor, since most plastics have some residual curve. Accordingly, the zero point is taken as the number of degrees departure from 90° at room temperature and room humidity. The unit is then placed in a humidity chamber and adjusted to various humidities by using saturated salt solutions. Actual humidities are monitored by an electric hygrometer unit. Readings are taken in degrees along the edge of the sample, as measured on the protractor. The humidity amplitude was taken as the change in degrees curl ($\Delta$) between 6–8 percent relative humidity and 90–95 percent relative humidity. The samples are allowed to condition for 16 hours at each humidity before the readings are taken, and the composite film is placed in such a manner that the gelatin coating is always on the same side of the sample.

Example 3

An orthochromatic silver-chlorobromide gelatin photographic emulsion was prepared by conventional procedures. Coatings on plastic film base were prepared using the blends of gelatin and the water insoluble polymers of Example 2 in which 0, 10, 20 and 40 percent of the total binder solids consisted of the water insoluble polymer. Silver/binder ratios of 1.0/0.60 and 1.0/0.80 were employed using silver coating weight of 50 mg./decimeter$^2$. Sensitometric measurements showed no adverse affect on sensitometry either in normal storage conditions or under accelerated aging conditions. Maximum density, gamma and development rate in all instances were not appreciably affected by the addition of the water insoluble polymer dispersion, and fog levels of about 0.04 or less were observed in all samples.

TABLE I

| Polymer dispersion | Monomer | Monomer (gm.) | Surfactant (gm.) | Initiator (mg.) | H₂O (gm.) | Temp. ° C. |
|---|---|---|---|---|---|---|
| A | Ethyl acrylate | 74.0 | ¹ 2.7 | 54 | 180 | 45 |
| B | Ethyl acrylate<br>Glycidyl methacrylate | 59.2<br>20.0 | ¹ 2.7 | 81 | 180 | 45 |
| C | Ethyl acrylate<br>Styrene<br>Glycidyl methacrylate | 60.0<br>20.8<br>28.4 | ¹ 3.5 | 105 | 255 | 47 |
| D | Ethyl acrylate<br>Acrolein | 95.0<br>2.80 | ¹ 3.5 | 70 | 225 | 50–60 |
| E | Ethyl acrylate<br>Glycidyl methacrylate | 51.8<br>31.5 | ¹ 2.8 | 81 | 195 | 45–50 |
| F | n-Butyl acrylate<br>Acrylonitrile<br>Glycidyl methacrylate | 38.4<br>23.9<br>35.5 | ¹ 3.5 | 105 | 225 | 50 |
| G | n-Butyl acrylate<br>Acrylonitrile<br>Acrolein | 102.4<br>53.0<br>11.2 | ¹ 5.0 | 350 | 328 | 55 |
| H | Ethyl acrylate<br>Acrylonitrile<br>Acrolein | 15.0<br>39.8<br>5.6 | ¹ 1.8 | 105 | 146 | 55 |
| I | Isoprene<br>Acrolein | 30.6<br>2.55 | (²) | 100 | 100 | 55 |

¹ Sodium lauryl sulfate.
² 0.80 gr. non-ionic wetting agent ("Sandozin NI," a product of Sandoz, Inc., Cincinnati, Ohio), 2.01 gr. sodium salt of alkylated aryl polyether sulfate ("Triton 770," a product of Rohm and Haas Co., Philadelphia, Pa.), 0.463 g. NaH₂PO₄·H₂O.

TABLE II

| Polymer dispersion | Percent replacement of gelatin | M.P. (° C.) | Wet scratch (g.) |
|---|---|---|---|
| Control | | 36 | (¹) |
| A | 20 | 40 | 40 |
|   | 40 | 40 | 42 |
|   | 60 | 40 | 44 |
| B | 20 | 65 | 42 |
|   | 40 | 91 | 55 |
|   | 60 | >98 | 112 |
| C | 20 | 43 | 46 |
|   | 40 | 87 | 59 |
|   | 60 | >98 | 117 |
| D | 20 | 79 | 48 |
|   | 60 | >98 | 128 |
| E | 40 | >98 | 54 |
|   | 60 | >98 | 145 |
| F | 60 | >98 | 216 |
| G | 20 | 85 | 150 |
|   | 60 | >98 | 288 |
| H | 60 | 95 | 296 |
| I | 60 | >98 | 322 |

¹ Too low to measure.

TABLE III

| Latex | Percent replacement of gelatin | Degrees curl |
|---|---|---|
| Control | 0 | 37 |
| A | 20 | 13 |
|   | 40 | 8 |
|   | 60 | 5 |
| B | 20 | 12 |
|   | 40 | 14 |
|   | 60 | 7 |
| C | 20 | 16 |
|   | 40 | 12 |
|   | 60 | 8 |

Example 4

The following data in Table IV illustrates the improvement in gelatin films achieved in the practice of this invention (Sample 4) as compared to unhardened gelatin (Sample 1), gelatin hardened with conventional formaldehyde hardener (Sample 2), and gelatin with a polymer having no gelatin reactive groups (Sample 3).

TABLE IV

| Film sample | Melting point, (° C.) | Wet scratch resistance | Curl |
|---|---|---|---|
| (1) Gelatin | 36 | [1] <40 | High. |
| (2) Gelatin (formaldehyde hardened). | >98 | [2] 400–420 | Do. |
| (3) Gelatin (40%)+polyisoprene (60%). | 50–75 | [1] <40 | Negligible. |
| (4) Gelatin (40%)+90/10 mol ratio isoprene/acrolein copolymer (60%). | >98 | [1] 410 [2] 520 | Do. |

[1] After aging at room temperature for 2 weeks.
[2] After aging at 50° C. for 2 days.

Sample 4 combined high melting point, high wet scratch resistance and negligible curl. Sample 2, which was extensively hardened with formaldehyde to improve wet scratch resistance, not only had high tendency to curl but also was quite brittle, had only relatively limited permeability to photographic processing solutions, and had high background fog level. Film Sample 4, by contrast, was flexible, was quite permeable to photographic processing solutions, and had no adverse sensitometric problems.

Example 5

A terpolymer latex was prepared in a conventional procedure using a sodium salt of an alkyl aryl polyether sulfonate ("Triton X-200," a trademarked product of Rohm and Haas Co.) as emulsifier and 4,4'-azo-bis-(4-cyanopentanoic acid) initiator under the following conditions Distilled water—400 grams
Emulsifier (as 29.5% solution)—21 grams
Isooctyl acrylate —69 grams
Glycidyl methacrylate—7.0 grams
N-(1-phenyl-5-oxo-pyrazoline-3-yl)-methacrylamide— 4.0 grams
Initiator—100 milligrams
Reaction temperature —50–60° C.

A portion of the resulting polymer latex (8.9 grams) was added in the dark to 50 grams of a gelatin-silver halide photoemulsion (5% silver, 10% gelatin), and coatings were prepared on a polyester film base. Image exposure and color processing, using N,N-diethyl-p-phenylene diamine color developer, resulted in formation of a magenta dye in the exposed areas of the fim and a low background fog level. The coatings had the advantages associated with gelatin reactive latices, e.g. reduced curl, resistance to abrasion and scrating, etc., while having the additional property of dye formation under processing conditions, due to the gelatin reactive terpolymer having recurring monomer units of an addition polymerizable monomeric color former, namely N-(1-phenyl-5-oxo-pyraozline-3-yl)-methacrylamide.

What is claimed is:

1. A substrate having thereon a layer comprising a continuous phase of gelatin and a water impermeable discontinuous phase of a normally solid, water insoluble polymer of at least one ethylenically unsaturated monomer, which polymer has a molecular weight of at least 10,000 and a degree of polymerization of at least 50 and which is insoluble in water below 60° C. at pH 5 to 11, said water insoluble polymer being covalently bonded directly to said gelatin at the interface between said phases.

2. The layer-containing substrate of claim 1 in which said water insoluble polymer is comprised of recurring monomer units derived from ethylenically unsaturated monomers, at least one mol percent of said monomers having gelatin-reactive groups.

3. The layer-containing substrate of claim 1 in which said layer contains photosensitive silver halide.

4. The layer-containing substrate of claim 1 in which said water insoluble polymer is a copolymer containing recurring monomer units, from about 5 to about 30 mol percent of said monomer units corresponding to an ethylenically unsaturated monomer having at least one gelatin-reactive group.

5. The layer containing substrate of claim 2 in which said gelatin-reactive group is an epoxy group.

6. The layer-containing substrate of claim 2 in which said gelatin-reactive group is an aldehyde group.

7. The layer-containing substrate of claim 1 in which the weight ratio of gelatin to said water insoluble polymer is between 100/1 and 5/95.

8. An aqueous dispersion comprising gelatin and a disperse phase of a normally solid, water insoluble polymer of at least one ethylenically unsaturated monomer, at least one mol percent of the monomer units in said polymer having gelatin-reactive groups, said water insoluble polymer having a molecular weight of at least 10,000 and a degree of polymerization of at least 50 and being insoluble in water below 60° C. at pH 5 to 11.

9. The aqueous dispersion of claim 8 in which said gelatin-reactive groups are epoxy groups.

10. The aqueous dispersion of claim 8 in which said gelatin-reactive groups are aldehyde groups.

11. The aqueous dispersion of claim 8 in which the weight ratio of gelatin to said water insoluble polymer is between 100/1 and 5/95.

12. The aqueous dispersion of claim 8 in which said water insoluble polymer has a molecular weight such that the glass transition temperature is substantially independent of molecular weight.

13. The aqueous dispersion of claim 8 in which said monomer units include an ethylenically unsaturated, polymerizable color former having a substituent group capable of forming a dye upon chromogenic development of exposed silver halide images with a primary aromatic amine color-developing agent.

14. An aqueous silver halide photographic coating composition comprising photosensitive silver halide, gelatin and a normally solid, essentially colorless, water insoluble polymer of at least one ethylenically unsaturated monomer, at least one mol percent of the monomer units in said polymer having gelatin-reactive groups, said water insoluble polymer having a molecular weight of at least 10,000 and a degree of polymerization of at least 50 and being insulable in water below 60° C. at pH 5 to 11.

15. A photosensitive emulsion comprising photosensitive silver halide, gelatin and, covalently bonded to said gelatin, uniformly dispersed particles of a normally solid, essentially colorless, water insoluble polymer of at least one ethylenically unsaturated monomer, at least one mol perment of the monomer units in said polymer having gelatin-reactive groups, said water insoluble polymer having a molecular weight of at least 10,000 and a degree of polymerization of at least 50 and being insoluble in water below 60° C. at pH 5 to 11.

16. The photosensitive emulsion of claim 15 in which the said weight ratio of gelatin to said water insoluble polymer is between 100/1 and 5/95.

17. The photosensitive emulsion of claim 15 in which said water insoluble polymer has a molecular weight such that the glass transition temperature is substantially independent of molecular weight.

18. A process for preparing an emulsion layer which comprises (1) admixing in aqueous media gelatin and a normally solid, water insoluble polymer of at least one ethylenically unsaturated monomer, at least one mole percent of the monomer units of said polymer having gelatin-reactive groups, said water insoluble polymer having a molecular weight of at least 10,000 and a degree of polymerization of at least 50 and being insoluble in water below 60° C. at pH 5 to 11, (2) coating said admixture onto a substrate, and (3) drying said coated emulsion whereby gelatin-reactive groups in said water insoluble polymer are covalently bonded to said gelatin.

19. The process of claim 18 in which said water insoluble polymer has a molecular weight such that the glass transition temperature is substantially independent of molecular weight.

References Cited

UNITED STATES PATENTS

| | | | |
|---|---|---|---|
| 3,158,484 | 11/1964 | Willems et al. | 96—107 |
| 3,306,750 | 2/1967 | Minsk et al. | 96—111 |

RONALD H. SMITH, Primary Examiner

U.S. Cl. X.R.

96—77; 106—125; 117—161, 164; 260—8